United States Patent Office 3,437,649
Patented Apr. 8, 1969

3,437,649
ISOMERIZATION OF BUTADIENE POLYMERS
Herbert Mueller, Frankenthal, Pfalz, Germany, assignor to Badische Anilin- & Soda-Fabrik Aktiengesellschaft, Ludwigshafen (Rhine), Germany
No Drawing. Filed Oct. 2, 1963, Ser. No. 313,162
Claims priority, application Germany, Oct. 3, 1962, B 69,073
Int. Cl. C08f 27/00; C08d 5/02
U.S. Cl. 260—94.7  6 Claims

ABSTRACT OF THE DISCLOSURE

Isomerization of polybutadiene containing isolated carbon-carbon double bonds by heating at 100–250° C. in the presence of a catalytic amount of a catalyst consisting essentially of the metals chromium, molybdenum, tungsten, manganese, iron, cobalt, nickel, palladium or platinum, including compounds of these metals where the metal is nonvalent. Examples of the essential catalyst are iron carbonyl or systems for producing the catalyst in situ such as nickel acetylacetonate in combination with triphenyl phosphine and triethylaluminum. The isomerized product is useful in making self-drying lacquers.

---

This invention relates to a process for isomerizing butadiene polymers.

It is known that elastomeric polybutadienes which are substantially unbranched can be prepared by polymerization of butadiene using catalysts composed of compounds of metals of Group VIII of the Periodic System (Handbook of Chemistry and Physics, 38th ed., Chemical Rubber Publishing Co., Cleveland, Ohio, pp. 394 and 395) and alkyl aluminum halides. Such polybutadienes exhibit mainly cis-1,4-structure and molecular weights of 100,000 or more, and only a few percent of the double bonds contained therein are present in the form of vinyl groups. These elastomeric polybutadienes may also be prepared by polymerization of butadiene using catalysts composed of titanium compounds and organo-aluminum compounds. It is known that in some cases oily polymers of butadiene, which have an intrinsic viscosity of about 0.4 in benzene at 32° C. and which mainly exhibit cis-1,4-structure, are obtained as by-products if catalysts composed of titanium tetrachloride and trialkyl aluminum compounds are used for the polymerization of butadiene. These oily butadiene polymers can be separated by fractionation with solvents and have molecular weights between 1,000 and 10,000. In these oily polybutadienes, the double bonds are also present exclusively as isolated double bonds.

The object of the present invention is to provide a process for the isomerization of butadiene polymers. Another object of the invention is to provide a process for the rearrangement of isolated double bonds in butadiene polymers to conjugated double bonds. It is also an object of this invention to provide a process for the production of butadiene polymers having conjugated double bonds from butadiene polymers which have only isolated double bonds. Other objects of the invention will be evident to those skilled in the art from the following description.

These objects can be realized by isomerizing butadiene polymers having a molecular weight of at least 1,000 and containing isolated double bonds in the presence of a small amount of a transition metal of Groups VI–B, VII–B and/or VIII of the Periodic System of Elements and/or a compound in which the said metal is present in a zerovalent condition by heating to temperatures between 100° and 250° C. Polybutadiene having a molecular weight of at least 500 and containing carbon-carbon double bonds, and which preferably has a substantially unbranched structure is an example of a suitable initial material, i.e., butadiene polymer. This may be prepared by a conventional method, at least 90% of the butadiene being polymerized with 1,4-addition and exhibiting cis- or trans-structure. For example high molecular weight elastomeric linear polybutadienes having molecular weights of about 100,000 or more may be used which have been prepared in known manner by polymerization of butadiene using catalysts composed of compounds of the metals of Group VIII and alkyl aluminum halides, and which have a fraction of cis-1,4-structure of at least 80%. Oily polybutadienes having molecular weights of 500 to 20,000, particularly of 1,000 to 10,000, equivalent to a degree of polymerization of about 20 to 200, and exhibiting substantially unbranched structure and containing isolated double bonds are preferred for the process. In general they have an intrinsic viscosity of 0.05 to 1.0 cm.$^3$/g. at 50° C. in benzene and may be prepared by conventional methods for example by polymerizing butadiene using catalysts composed of titanium tetrachloride and trialkyl aluminum compounds. Oily polybutadienes of the said type may be obtained particularly well by polymerizing butadiene at pressures up to about 10 atmospheres using catalysts containing compounds containing nickel in 0-valent form, at temperatures between about 0° and 90° C. in the presence of inert solvents, such as benzene or toluene. No protection is claimed in the present specification for the production of these oily polybutadienes. The oily polybutadienes may be used direct for isomerization by the process according to the present invention if desired immediately after production without purification or isolation from the reaction mixture. In general the suitable butadiene polymers have molecular weights of 500 to 100,000, determined according to Uberreither, "Makromolekulare Chemie," vol. 8 (1952), 21–28.

Other suitable initial materials for the process are butadiene polymers having any double bond distribution, for example polybutadiene oils having mainly 1,2-structure, and copolymers of preponderant amounts of butadiene with other ethylenically unsaturated monomers, for example with styrene. Butadiene polymers which, like "Buna 32," have been prepared using alkali metals, for example sodium or lithium, as catalysts, and have molecular weights of about 500 to 20,000 and mainly 1,2-structure, are also suitable.

Particularly high rates of isomerization are achieved with metals of Group VIII and compounds in which these metals are present in zerovalent form. Suitable transition metals of Groups VI–B, VII–B and VIII are for example chromium, molybdenum, tungsten, manganese, iron, cobalt, nickel, palladium and platinum. The transition metals used in the process should be as finely divided as possible. They may be obtained for example by reduction of dissolved metal salts, if desired within the reaction mixture. Suitable compounds containing metals of Groups VI–B, VII–B and VIII in zerovalent form are for example nickel (0)-bis-cyclo-octadiene-(1, 5), nickel (0)-bis-acrylonitrile triphenyl phosphine, nickel(0)-cyclo-dodecatriene-(1, 5), nickel(0)-tetra-bis-triphenyl phosphine, nickel(0)-tris-triphenyl phosphite, nickel carbonyl, chromium hexacarbonyl, manganese pentacarbonyl, dicobalt octacarbonyl, cobalt carbonyl hydride, nitrosyl cobalt tricarbonyl and particularly the carbonyl compounds of iron, such as iron carbonyl hydride, iron pentacarbonyl and di-iron eneacarbonyl. The metal atoms in compounds of this type are zerovalent, i.e., they exhibit a valence of zero, do not carry any electric charge and are therefore nonvalent.

The zerovalent compounds of the said metals may also be produced in situ by reducing a compound which contains the metal in a higher valence in the presence of a complex-forming substance. Preferred metal compounds suitable for this purpose are the salts of inorganic and organic acids and also chelate complexes, for example nickel chloride, nickel bromide, nickel iodide, nickel carbonate, nickel acetate, nickel benzoate, nickel sulfate, nickel nitrate, nickel acetylacetonate, nickel acetoacetic ester, nickel benzoylacetonate, nickel dimethyl glyoxime, ferrous chloride, ferric sulfate, ferric acetylacetonate, ferrous acetate, ferric acetoacetate, cobalt acetate, cobalt sulfate, cobalt chloride, cobalt acetylacetonate, potassium hexachloroplatinate (IV), palladous chloride, chromic chloride, manganese acetate, chromyl chloride. Examples of other suitable compounds are nickelous oxide, nickelous hydroxide, nickelic oxide, ferric hydroxide, palladium oxide and manganese oxide.

Triphenyl phosphine, carbon monoxide, tritolyl phosphite, diphenyl sulphide, nitrogen monoxide, triethyl arsine, triphenyl phosphite, acetylene and also polyenes are among complex-forming substances which may be present during the reduction of the higher-valent metal compounds. Suitable acetylenes are for example phenylacetylene, tolane, and dimethylacetylene. Examples of suitable polyenes are 1, 3-dienes, such as butadiene, cyclopentadiene, cyclohexadiene and isoprene, and also cyclooctadiene-(1, 5), cyclo-dodecatriene-(1, 5, 9) and bicyclo-[1, 2, 2]-heptadiene-(2, 5).

Examples of suitable reducing agents are hydrogen or compounds of elements of Groups I–A, II–A, or III–A of the Periodic System which contain at least one hydrogen atom attached to the element and/or an organic radical attached to the element via a carbon atom. Of these compounds, those of lithium, sodium, potassium, magnesium, calcium, boron and aluminum are preferred for reasons of accessibility alone. The following are examples of compounds which are suitable for the reaction: lithium hydride, sodium hydride, calcium hydride, aluminum hydride, phenyl sodium, phenyl lithium, phenyl magnesium, diborane, triethyl boron, triethyl aluminum, diisobutyl aluminum hydride, diethyl zinc and diethyl cadmium. Other suitable reducing agents are complex compounds containing a plurality of the said elements, for example lithium aluminum hydride, sodium ethylethoxy aluminum hydride and lithium borohydride. Metals such as lithium, sodium, calcium, magnesium, zinc or aluminum may also be used for the reduction of the metal compounds having higher valence.

Instead of a metal compound and a reducing agent, it is also possible to use a metal compound which contains the metal in a higher valence and an anion having a reducing action. Examples of such compounds are nickel formate, triphenyl chromium and nickel oxalate.

The catalyst need be used in only a small amount. Even 0.001 to 0.1 times the amount of the initial material is often sufficient. In general 0.01 to 10%, preferably 0.1 to 3%, by weight of catalyst with reference to the amount of butadiene polymer is used.

It is advantageous to carry out the process while carefully excluding moisture and oxygen. Isomerization may also be carried out in the presence of inert solvents, and when isomerizing polybutadiene having molecular weights above 20,000, particularly elastomeric polybutadienes, the coemployment of solvents is preferred.

Examples of suitable solvents are aliphatic, cycloaliphatic and aromatic hydrocarbons and ethers, such as hexane, heptane, cyclohexane, xylene, benzene, petroleum fractions boiling between 60° and 200° C., tetrahydrofurane and diisopropyl ether.

The new process may be carried out at temperature of 100° to 250° C. The most favourable reaction temperature depends on the catalyst and is usually between 100° and 200° C., because at lower temperatures the reaction speed is low and at higher temperatures undesirable secondary reactions occur to an increasing extent. Temperatures of 130° to 180° C. are preferred in the process. The reaction may be carried out at atmospheric pressure, but superatmospheric pressures, for example up to 30 atmospheres, may also be used. The use of superatmospheric pressure is necessary if the reaction is carried out at a temperature above the boiling point of the solvent.

To carry out the process, the catalyst or the substances from which the catalyst is to be formed are brought together with the initial material, if necessary in the solvent provided for the reaction. The mixture is then heated for some time, for example for one hour or more, to the desired reaction temperature. When isomerization is over, the catalyst may if desired be decomposed by adding water and washed out or separated, for example by filtration. If isomerization has been carried out in the presence of a solvent, this may be separated from the isomerized polybutadienes for example by distillation.

Isolated double bonds in the polybutadienes are rearranged to conjugated double bonds in the process. Starting from relatively unreactive polybutadienes having isolated double bonds, very reactive polybutadienes are obtained containing a comparatively large number of conjugated double bonds and which add on to dienophilic compounds even at low temperatures, for example at room temperature. The substances obtained according to this invention are valuable raw materials and may be used for example for the production of self-drying lacquers. When they are exposed in a thin layer to the action of the air, they form in a short time, even without the use of catalysts, elastic glossy films which are insoluble in organic solvents. Film formation can be accelerated by adding peroxides and/or heavy metal salts.

The invention is illustrated by the following examples. The parts specified in the examples are parts by weight. The intrinsic viscosities given in the examples are determined according to the method described in "Methoden der Organischen Chemie," Houben-Weyl, 4th ed. 3/1, and the diene numbers according to ibid 2.

EXAMPLE 1

2 parts of iron pentacarbonyl is added to a solution of 100 parts of a polybutadiene oil (see below) in 200 parts of xylene. The reaction mixture is heated for three hours at 140° C. while stirring. The product is allowed to cool to room temperature, is filtered and the xylene is distilled off under subatmospheric pressure. The distillation residue is 100 parts of a polybutadiene oil having a diene number of 50 which when spread in a thin layer dries in the air to form a film. The infrared spectrum of the polybutadiene oil obtained shows that no additional vinyl groups have been formed during isomerization.

The polybutadiene oil used as initial material has a diene number of 2 and an intrinsic viscosity $\eta = 0.28$ cm.$^3$/g. in benzene at 50° C. As regards double bonds, it has the following structure: 22% of trans, 76% of cis and 2% of vinyl groups.

The initial polybutadiene oil is prepared as follows: 1,500 parts of butadiene is passed in the gas phase into a solution of 0.3 part of bis-cyclooctadiene-(1, 5) nickel (0) and 3 parts of ethyl aluminum sesquichloride in 1,000 parts of water-free benzene at 40° C. within 3 hours. 1,500 parts of the polybutadiene oil can be isolated from the reaction mixture by a conventional method.

EXAMPLE 2

2.5 parts of nickel acetylacetonate, 12 parts of triphenyl phosphine and 4.5 parts of triethyl aluminum are added to a solution of 200 parts of the initial polybutadiene oil described in Example 1 in 200 parts of xylene. The reaction mixture is heated to 140° C. for 6 hours while stirring. It is then cooled to room temperature, extracted three times, each time with 400 parts of water, and filtered. After the xylene has been evaporated under subatmospheric pressure, 190 parts of a polybutadiene oil is obtained which has the diene number 40.

EXAMPLE 3

A mixture of 100 parts of the initial polybutadiene oil described in Example 1, 200 parts of xylene and 2 parts of dicobalt octacarbonyl is heated for 3 hours at 180° C. in an autoclave. After the whole has been worked up conventionally, 98 parts of a polybutadiene oil is obtained which has a diene number of 34.

EXAMPLE 4

5.2 parts of ferric acetoacetate is reacted with 4.3 parts of diethyl aluminum hydride in 200 parts of xylene at 25° C. and a suspension of very finely divided iron in xylene is obtained. 100 parts of a polybutadiene oil (see below) is added to the reaction mixture which is heated for 3 hours at 140° C. with stirring. 98 parts of a brown polybutadiene oil is isolated from the reaction mixture by a conventional method, and it has a diene number of 46.

The polybutadiene oil used as initial material has a diene number of 4 and an intrinsic viscosity of $\eta = 0.38$ cm.$^3$/g. in benzene at 50° C. Its structure as regards double bonds is as follows: 82% of cis, 15% of trans and 3% of vinyl groups.

Practically the same product is obtained by using diethyl zinc or phenyl lithium instead of diethyl aluminum hydride. The polybutadiene is prepared in the manner described in Example 1 but polymerization is carried out at 0° C.

EXAMPLE 5

5 parts of iron pentacarbonyl is added to a solution in 500 parts of xylene of 500 parts of a commercial high-viscosity styrene-butadiene copolymer containing 80% of butadiene and 20% of styrene in polymerized form and having a mean molecular weight of about 10,000. The reaction mixture is then heated for 4 hours at 140° C. The product is worked up in the usual way and 490 parts of isomerized high-viscosity copolymer is obtained. The following test is carried out to detect isomerization:

50 parts of the isomerized polymer is mixed with 10 parts of a 10% solution of cobalt naphthenate in xylene and 2 parts of a 50% paste of cyclohexanone peroxide in dibutyl phthalate and applied in a layer about 250 microns in thickness to a glass sheet. After 7 hours, the applied layer has dried so far that grains of sand do not adhere to it. If the same test is applied to the initial product under the same conditions, 15 hours are required for drying.

EXAMPLE 6

2 parts of manganese acetylacetonate and then 4 parts of triethyl aluminum are added to a mixture of 100 parts of the polybutadiene oil described in Example 1 and 100 parts of xylene. The mixture is heated for 5 hours at 145° to 150° C. After the whole has cooled, the solvent is separated by distillation under subatmospheric pressure. An oil which dries rapidly is obtained as residue.

For example if the oil is brushed onto a sheet of glass in a thickness of about 250 microns and then heated to 120° C., the oil film is dried to such an extent after ten to fifteen minutes that grains of sand will not adhere to it. If this test is however applied to the polybutadiene oil used as initial material, under the same conditions, a period of about 1 to 2 hours elapses before the oil film has reached the same condition of drying.

Chromium acetylacetonate may be used instead of manganese acetylacetonate.

EXAMPLE 7

42 parts of iron pentacarbonyl is added to 1,400 parts of a polybutadiene (having a molecular weight of 6,500 and having its double bonds present to the extent of 83% in vinyl groups, 12% in trans structure and 5% in cis structure) obtained in the usual way, in 2,000 parts by volume of xylene, and the mixture is heated at about 140° C. with exclusion of air for 8 hours. The volatile constituents are then distilled off under subatmospheric pressure and the remaining oil is heated for another 4 hours at 150° C. at $10^{-3}$ mm. Hg. A dark brown viscous oil is obtained having a mean molecular weight of about 6,500. Its viscosity is 6,600 cp. at 50° C. and 2,200 cp. at 130° C.

The following test is carried out to detect the isomerization which has taken place:

The oil is applied to a sheet of glass in a thickness of 50 microns and heated to 120° C. Thirty-five to 40 minutes later, a brownish, clear and very hard film has been formed to which grains of sand do not adhere when scattered on it. The oil used as initial material does not exhibit the same degree of dryness until after a drying period of more than 3 hours at 120° C.

EXAMPLE 8

3 parts of bis-cyclooctadiene-(1, 5) nickel(0) is added to a solution of 200 parts of the polybutadiene oil initial material described in Example 1 in 200 parts of xylene and the reaction mixture is heated for 6 hours at 140° C. while stirring. The solvent is then distilled off under subatmospheric pressure. The residue is an oil which when applied to a sheet of glass in a layer 50 microns in thickness dries in about 10 to 20 minutes to a hard glossy film. The initial material does not exhibit the same degree of dryness until after a drying period of at least 1 hour at 120° C.

A similar result is obtained by using the same amount of dicobalt octacarbonyl as the isomerization catalyst instead of biscyclooctadiene-(1, 5) nickel(0).

I claim:
1. A process for the production of a butadiene polymer having conjugated double bonds by isomerization of a butadiene polymer having a molecular weight of about 500 to 100,000 and containing isolated carbon to carbon double bonds, said process comprising: heating said butadiene polymer containing isolated double bonds at a temperature between about 100° C. and 250° C. while excluding moisture and oxygen in a reaction medium consisting essentially of said polymer and about 0.001 to 3% by weight thereof of a catalyst selected from the group consisting of chromium, manganese, iron, cobalt, and nickel and compounds of these metals in which the metal atom has a valency of zero.

2. A process as claimed in claim 1 wherein the catalyst is iron pentacarbonyl.

3. A process as claimed in claim 1 wherein the catalyst is dicobalt octacarbonyl.

4. A process for the production of a butadiene polymer having conjugated double bonds by isomerization of a butadiene polymer having a molecular weight of about 500 to 100,000 and containing isolated carbon to carbon double bonds, said process comprising: heating said butadiene polymer containing isolated double bonds at a temperature between about 100° C. and 250° C. in a reaction medium consisting essentially of said polymer and about 0.001 to 3% by weight thereof of a nickel catalyst prepared in situ from triphenyl phosphine, triethylaluminum and nickel acetylacetonate.

5. A process for the production of a butadiene polymer having conjugated double bonds by isomerization of a butadiene polymer having a molecular weight of about 500 to 100,000 and containing isolated carbon to carbon double bonds, said process comprising: heating said butadiene polymer containing isolated double bonds at a temperature between about 100° C. and 250° C. in a reaction medium consisting essentially of said polymer and about 0.001 to 3% by weight thereof of an iron catalyst prepared in situ from diethyl aluminum hydride and ferric acetoacetate.

6. A process for the production of a butadiene polymer having conjugated double bonds by isomerization of a butadiene polymer having a molecular weight of about 500 to 100,000 and containing isolated carbon to carbon double bonds, said process comprising: heating said butadiene polymer containing isolated double bonds at a temperature between about 100° C. and 250° C. in a reaction medium consisting essentially of said polymer and about 0.001 to 3% by weight thereof of a manganese catalyst prepared in situ from triethyl aluminum and manganese acetylacetonate.

References Cited

UNITED STATES PATENTS

| | | | |
|---|---|---|---|
| 1,891,203 | 12/1932 | Ambros et al. | 260—94.2 |
| 3,278,441 | 10/1966 | Manuel et al. | 252—62.5 |
| 3,281,403 | 10/1966 | Manuel et al. | 260—94.7 |
| 3,282,909 | 11/1966 | Manuel et al. | 260—94.7 |

JOSEPH L. SCHOFER, *Primary Examiner.*

WILLIAM F. HAMROCK, *Assistant Examiner.*

U.S. Cl. X.R.

260—85.1, 683.65; 252—431